Figure 1:
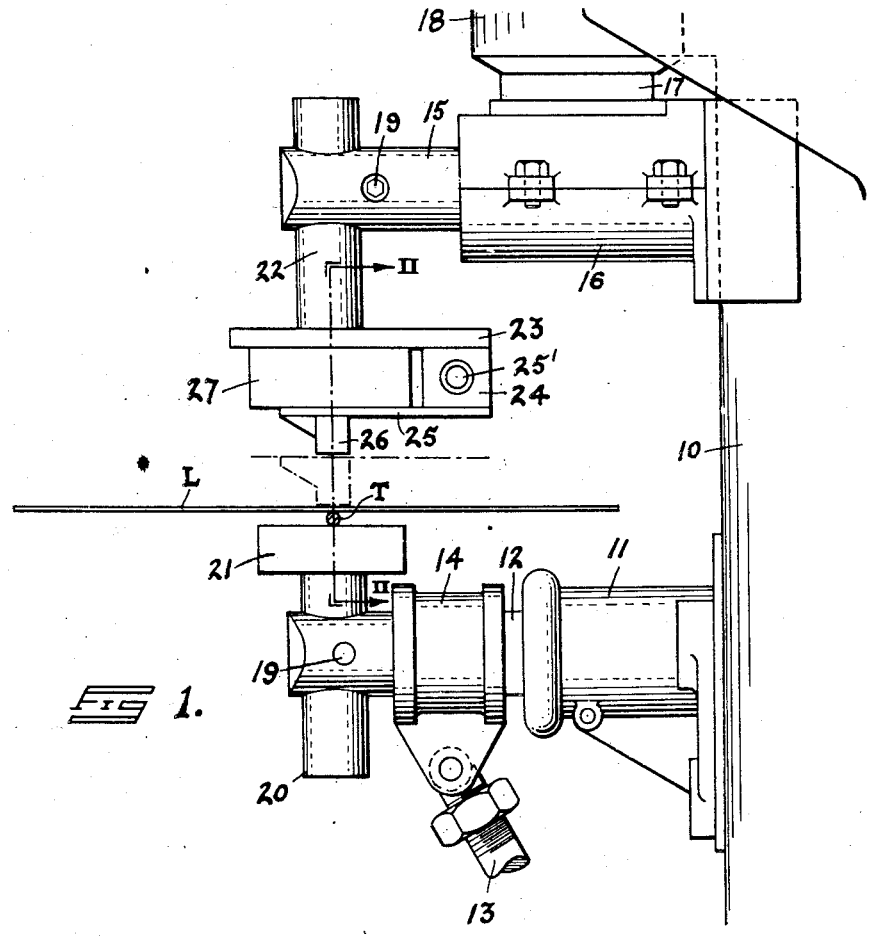

Dec. 16, 1941.   S. M. HUMPHREY   2,266,424

ELECTRODE ASSEMBLY FOR MULTIPLE POINT WELDING

Filed May 28, 1940

Inventor
STANLEY M. HUMPHREY

By Francis J. Klempay

Attorney

Patented Dec. 16, 1941

2,266,424

UNITED STATES PATENT OFFICE 2,266,424

ELECTRODE ASSEMBLY FOR MULTIPLE POINT WELDING

Stanley M. Humphrey, Warren, Ohio, assignor to Taylor-Winfield Corporation, Warren, Ohio, a corporation of Ohio Application May 28, 1940, Serial No. 337,619

7 Claims. (Cl. 219—4)

This invention relates to an electrode assembly for a welding machine and more particularly to an electrode for simultaneously effecting welds at a multiplicity of spaced points. The electrode of the invention is particularly applicable where it is desired to simultaneously effect such welds with the use of a conventional spot welder having but one movable quill or electrode operating assembly.

In making a large number of welds simultaneously from one welding circuit it is usually necessary to apply a very uniform pressure to each of the points of weld and this is particularly true in the welding of chrome alloy steels. If the points to be welded are spread over a considerable interval, conventional die electrodes, if used, must be accurately constructed and maintained, the latter limiting the productive output of the machine. Moreover, variations in the thickness of the stock at the different points of weld will result in no welds being effected at certain points.

The primary object of the invention, therefore, is to provide an electrode assembly for a welding machine which is operative in connection with a conventional spot welder having but one electrode operating assembly to simultaneously effect welds at a multiplicity of spaced points irrespective of variations in the thickness of the stock at the various points. Thus in the manufacture of wire trays or grilles it is possible, by the use of the invention, to weld a transverse wire to each of the longitudinally extending wires simultaneously, regardless of variations in the diameters of the longitudinally extending wires. This is accomplished in accordance with the present invention by providing one of the electrodes with a plurality of relatively movable fingers which are free to independently move through several thousandths of an inch and providing resilient means to exert forces on the fingers to insure the maintenance of the required welding pressures.

Another object of the invention is the provision of an electrode assembly having the operating characteristics enumerated above but which is simple in design and economical to construct. In accordance with the invention a plate of high electrical conductivity carries a block on one face and adjacent one end thereof which block may be hollow to provide a passage therethrough for cooling fluid. On the face of said block opposite the plate are attached a plurality of fingers which extend substantially parallel with the plate and which carry outwardly projecting work engaging ends. Positioned between the fingers and the plate is a block of soft rubber which is operative to resiliently urge the respective ends of the fingers into engagement with the stock at the points to be welded.

These and other objects and advantages of the invention will become apparent from a consideration of the following detailed specification and the accompanying drawing wherein there is specifically disclosed a preferred embodiment of the invention.

Figure 2:
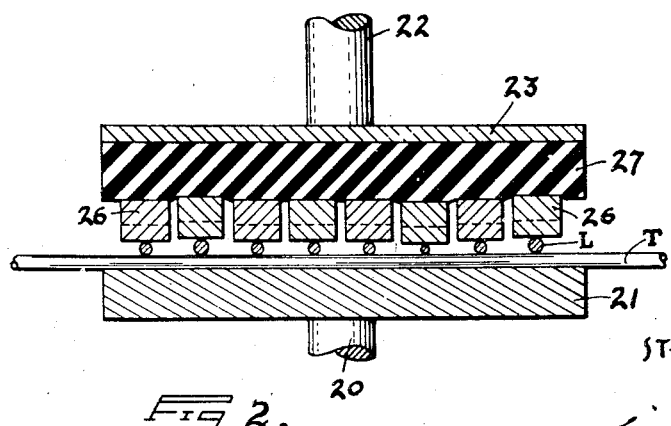

In the drawing:

Figure 1 is a side view of a portion of a welding machine showing the improved electrode assembly of the invention in operative position on said machine; and Figure 2 is a front view of the improved electrode assembly.

In the drawing, reference numeral 10 designates the body of a conventional spot welding machine which machine, in accordance with usual practice, is provided with a normally fixed bracket 11 carried by the body from which extends outwardly a horn 12, the latter being braced by a rod 13 connected at its upper end with the collar 14 encircling the outer portion of the horn and at its inner end with the body or frame. An upper horn 15 is carried by a block 16 which in turn is carried by a rod or quill 17 slidably received in a housing 18 attached to the body 10. In accordance with the usual practice suitable mechanism (not shown) is provided to move the rod 17 and to apply welding pressure therethrough.

Horns 12 and 15 are connected to a suitable source of welding current as the secondary winding of a welding transformer, the connection to the horn 15 being flexible to allow the horn to be raised and lowered, and, as usual, the outer ends of the horns are arranged with clamping bifurcations to releasably retain the electrodes, clamping screws 19 being provided to clamp the bifurcations about the electrodes.

In accordance with the present invention a post 20, having a flat bar 21 made integral therewith or rigidly attached thereto at its upper end, is carried by the outer end of the lower horn 12 by the conventional electrode retaining means thereof. Bar 21 is provided with a flat upper surface and the post and bar are both of highly conductive material. A post 22 is carried by the upper horn 15 by the electrode holding means thereof and welded or otherwise suitably attached to the lower end of the post 22 is a plate 23 eccentrically disposed with respect to the post.

A block 24, having a passage 25' for cooling fluid, is attached to the underside of the plate 23 and to the block 24 are attached a plurality of fingers 25 which are spaced apart a sufficient interval to allow independent flexing movement thereof.

Depending from the outer end of each of the fingers 25 is an electrode 26 which is adapted to contact the material to be welded. It should be understood that the length of the bar 21 and the plate 23 and the number and spacing of the fingers 25 and the electrodes 26 is determined by the character of the welding operation to be effected. For example, the number of fingers 25 and electrodes 26 used would be the same as the number of points to be welded in one operation. Positioned between the free ends of the fingers 25 and the plate 23 is a block 27 of resilient material and it has been found in practice that a block constructed of soft rubber will produce satisfactory results.

The operation of the apparatus will be described in connection with a representative use of the same as indicated in the drawing. Reference letter T indicates a wire which it is desired to weld at right angles to a number of spaced parallel wires indicated generally by the reference letter L. In the quantity production of certain articles, such as wire trays or grilles where a large number of welds must be made in each article, it is desirable to simultaneously effect a large number of welds with each operation of the welding machine. In the apparatus specifically described the number and spacing of the fingers 25 and their attached electrodes 26 is equal to the number and spacings of the parallel wires L. The transverse wire T is placed on the bar 21 under the electrodes 26 and the longitudinal wires L placed at right angles thereover. If the welding machine is now operated, the plate 23 and the attached ends of the fingers 25 will be moved vertically and electrodes 26 brought into engagement with the work. Fingers 25 will be flexed upwardly against the expansive force of the block 27 to an extent determined by the diameter of the particular wire L which the respective fingers contact. It has been found that even though considerable variation may occur in the diameters of the wires L, as indicated in the drawing, a substantially uniform pressure is applied to each of the wires and this is brought about by the fact that the block 27 is of substantial thickness and may be subjected to considerable deformation without requiring any substantial increase in the deforming force.

It should now be apparent that the invention provides an apparatus which accomplishes the objects initially set out. The apparatus of the invention is simple in design, easy to construct and is adaptable for use in connection with conventional spot welders to apply equal pressures to a large number of points to simultaneously effect a large number of welds. The specific disclosed embodiment of the apparatus of the invention should be considered as illustrative only as obviously many changes may be made therein without departing from the spirit or scope of the invention. For example, the multiple electrode assembly may be positioned in the fixed horn of the machine and the cooperating bar fixed in the movable horn thereof. Also, the apparatus may be varied in specific design and used in conjunction with other machines for other specific purposes. Reference should, therefore, be had to the appended claims in determining the scope of the invention.

What I claim is:

1. An electrode assembly for an electric welding machine comprising in combination a member having an extended surface adapted to contact one side of the work to be welded, a plurality of electrodes adapted to contact the other side of the work to be welded at spaced points, a plate spaced from said electrodes and positioned on the opposite side thereof from said work, a hollow block carried by said plate, a plurality of yieldable fingers attached to said block and each carrying at its outer free end one of said electrodes, a block of soft rubber between the outer free ends of said fingers and said plate, and means to attach said member and said plate to the current conducting and electrode moving means of a welding machine.

2. An electrode assembly for an electric welding machine comprising in combination a member having an extended surface to contact one side of the work to be welded, a plurality of individual electrodes adapted to contact the other side of the work to be welded at spaced points, a member spaced from said electrodes and positioned on the opposite side thereof from said work, a block having a passage therethrough for cooling fluid carried by said second mentioned member, a plurality of yieldable fingers carried with and extending outwardly from said block and each carrying at its outer free end one of said individual electrodes, a block of resilient material between the outer free ends of said fingers and said second mentioned member, and means to attach said first and second mentioned members to the current conducting and electrode moving means of a welding machine.

3. An electrode assembly for a welding machine comprising in combination a post adapted to be carried by one of the electrode carrying means of an electric welding machine, a member having an extended surface to engage one side of the work to be welded carried by one end of said post, a second post adapted to be carried by the other electrode carrying means of the welding machine and having a plate eccentrically attached to one of its ends, a current conducting block carried by said plate on the face thereof opposite said post, a plurality of yieldable fingers carried by and extending outwardly from said block in spaced relation to said plate, an electrode carried by the outer free end of each of said fingers, said electrodes adapted to overlie said surface, and a block of resilient material positioned between said plate and the outer free ends of said fingers.

4. An electrode assembly for an electric welding machine comprising in combination a post adapted to be carried by one of the electrode holders of the welding machine, a bar attached at its middle portion to one end of said post and extending at right angles to the principal axis of said post, a second post adapted to be carried by the other electrode holder of the welding machine and carrying at one of its ends a plate disposed normal and eccentric with respect thereto, a block having a passage therethrough for cooling fluid carried by said plate on the opposite end and face thereof from said post, a plurality of yieldable fingers carried by and extending outwardly from said block in spaced relation to said plate, an electrode carried by the outer free end of each of said fingers, and a block of soft rubber positioned between said fingers and said plate, the arrangement of the parts being such that when said assembly is mounted for operation in a welding machine the electrodes overlie said bar.

5. An electrode assembly for an electric welding machine comprising in combination a member having an extended surface to contact one side of the work to be welded, a plurality of individual electrodes adapted to contact the other side of the work to be welded at spaced points, means to attach said member to an electrode holder of a welding machine, a block, a plurality of flexible fingers carried by and extending outwardly from said block and each carrying at its outer free end one of said individual electrodes, means to support said block from the other electrode holder of the welding machine whereby said individual electrodes will overlie said surface, and resilient means carried with said block to urge the outer free ends of said fingers toward said surface whereby welding pressure will be exerted on the work positioned between said surface and said individual electrodes.

6. An electrode assembly for an electric welding machine comprising in combination a member having an extended surface to contact one side of the work to be welded, a plurality of individual electrodes adapted to contact the other side of the work to be welded at spaced points, a block, a plurality of flexible current conducting fingers carried by and extending outwardly from said block and each carrying at its outer free end one of said individual electrodes, means to move said member and said block toward and away from each other and to conduct welding current thereto whereby said individual electrodes will overlie said surface, and resilient means carried with said block to urge the outer free ends of said fingers toward said surface.

7. An electrode assembly for an electric welding machine comprising a block, a plurality of flexible current conducting fingers carried by and extending outwardly from said block, an electrode carried by the outer free end of each of said fingers, means carried with said block to resiliently urge said fingers to outer flexed position, and means to support and supply welding current to said block.

STANLEY M. HUMPHREY.